United States Patent
Warman

[15] 3,653,705
[45] Apr. 4, 1972

[54] CONSTRUCTION FOR FLUID TIGHT JOINTS

[72] Inventor: Charles Harold Warman, Castlecrag, Australia

[73] Assignee: Warman Equipment (International) Ltd., Belmont, Australia

[22] Filed: Oct. 21, 1970

[21] Appl. No.: 82,695

[30] Foreign Application Priority Data

Oct. 23, 1969 Australia ............................62721/69

[52] U.S. Cl..............................292/256.65, 220/55, 292/54
[51] Int. Cl.........................................B65d 45/32, E05c 7/00
[58] Field of Search...............292/31, 54, 55, 256.5, 256.65, 292/256.67; 285/320, 309, 310; 220/55 E, 55 G, 55 AN, 55 D; 49/465

[56] References Cited

UNITED STATES PATENTS

| 1,051,530 | 1/1913 | Whalen | 292/54 |
| 3,235,124 | 2/1966 | Kuerer | 220/55.3 |
| 3,293,665 | 12/1966 | Langer | 292/256.65 X |

Primary Examiner—Robert L. Wolfe
Attorney—Walter G. Finch

[57] ABSTRACT

A fluid-tight joint formed between at least two adjoining members wherein matching tapered annular joint faces are provided on the members to be jointed, a plurality of bell-crank levers is provided each arranged with one arm thereof adapted to engage a segmental lug on one of the adjoining members, and a tension ring circumscribes the other arms of the bell-crank levers with contraction of the tension ring serving to bring the adjoining members into sealing engagement.

5 Claims, 4 Drawing Figures

PATENTED APR 4 1972 3,653,705

CHARLES H. WARMAN
INVENTOR

By Walter G. Finch
ATTORNEY

CONSTRUCTION FOR FLUID TIGHT JOINTS

This invention relates to the jointed members of centrifugal pump casings and the like which require to be fluid tight and capable of easy assembly and dissembly.

One object of the invention is to provide a low cost construction for jointed members made from hard brittle materials which are difficult to machine. Another object is to provide a construction for jointed expendable members, such as the casing members of dredge and slurry pumps which are often subject to considerable wear and frequent replacement, whereby the joining parts of such members comprise a small fraction of the discarded material and manufacturing cost. Features of the invention are that the construction allows of easy assembly and dissembly of the components, provides co-axial location of the members and permits them to be joined in any relative angular position about the axis of the joint.

In accordance with the present invention there is provided a construction for jointed members comprising: at least two adjoining members having opposed matching tapered annular joint faces provided thereon; an annular fulcrum surface adjacent and co-axial with the external edge of the joint face on one of said adjoining members; a plurality of segmental lugs adjacent and co-axial with the external edge of the joint face on another of said adjoining members; a bell-crank lever for each said segmental lug; each said bell-crank lever bearing at its fulcrum on said annular fulcrum surface and having arms approximately radial outward and axial therefrom; the radial arm of each said bell-crank lever being adapted to respectively engage one of said segmented lugs; the axial arm of each said bell-crank lever having a groove near the end thereof remote from its fulcrum; a tension ring member supported in said grooves and circumscribing said axial arms; adjustable means to contract said tension ring member to thereby draw said axial arms inwardly, the inward movement of said axial arms causing the radial arms of said bell-crank levers to exert oppositely directed forces against said segmental lugs and said annular fulcrum surface respectively with the axial components of these oppositely directed forces serving to press the joint faces of the adjoining members together with sufficient force to form a sealed joint between said adjoining members.

To facilitate making the joint between the members fluid tight, at least one of the opposed matching tapered annular joint faces is preferably formed on resilient deformable jointing material which may be cemented or bonded to and form part of one of the adjoining members.

To compensate for dimensional variations in the members being jointed, and to provide initial locating pressure between the tapered joint faces, the engaging faces of the segmental lugs and the respective radial arms of the bell-crank levers preferably have, with respect to the axis of the joint, matching helical forms and initial axial clearance, circumferential movement of the bell-crank levers relative to the jointed members serving to take up said initial axial clearance and to establish the initial locating pressure between the joint faces of the adjoining members prior to tightening the tension ring.

To simplify assembly of the respective components, the bell-crank levers may be arranged in separate assemblies with each assembly comprising two or more levers connected by a segmental round torsion bar which permits both relative and combined elastic angular movement of the connected levers in each assembly.

In a variant form of the invention there are three adjoining members and one of the opposed matching tapered annular joint faces is provided mutually on and by two adjoining members which oppose one another axially.

The invention will now be more particularly described in relation to the accompanying drawings which illustrate preferred forms thereof. In the drawings.

Like parts are denoted by like characters throughout the specification and drawings.

Figure 1:
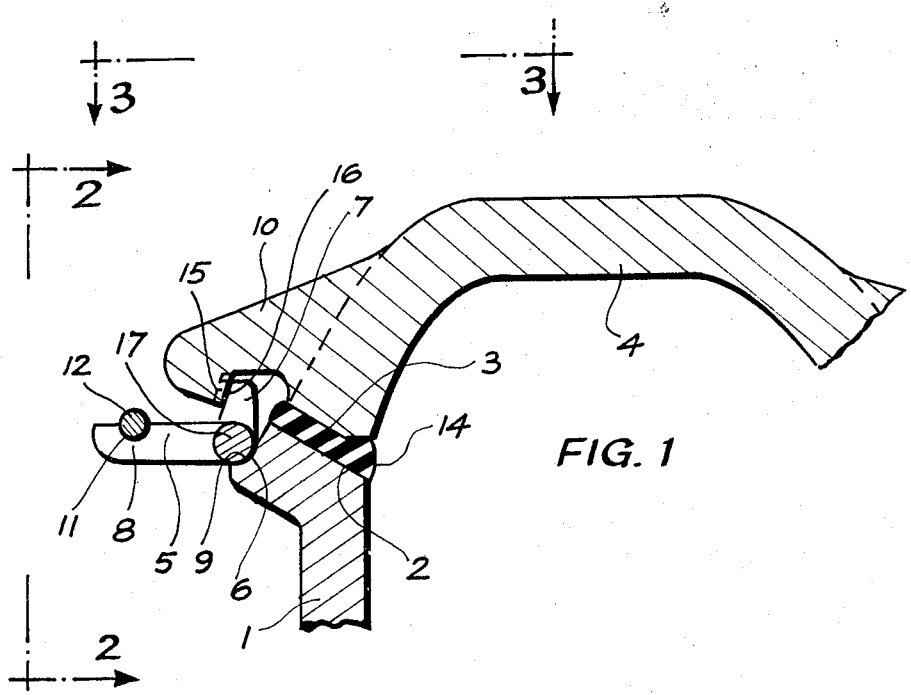
FIG. 1 is a part axial section of a pump casing showing a joint formed between two adjoining members.

As shown in FIG. 1 of the drawings a door member 1 is provided peripherally with a smooth tapered annular sealing face 2 adapted to be brought into and held in sealing contact with an opposing matching tapered annular sealing face 3 provided on an adjoining bowl member 4 by means of bell-crank levers 5 spaced substantially uniformly externally along the joint between said members 1 and 4, with the fulcrum for each of the said bell-crank levers being in the form of an annular concave surface 6 provided on door member 1 adjacent the external edge of its sealing face 2. Each bell-crank lever 5 has an arm 7 approximately radial outward and an arm 8 approximately axial from the fulcrum bearing surface 9, with each radial arm being adapted to engage a corresponding segmental lug 10 on bowl member 4 and each axial arm having a groove 11 in its outer surface adjacent its end remote from the fulcrum. A tension ring member 12 which passes around all the axial arms of said bell-crank levers is positioned and supported in the grooves 11 and serves to draw the levers 5 uniformly inwardly towards the axis of the joint when tightened by means of a right and left hand threaded tensioning nut 13. As the axial arms 8 are drawn inwardly the radial arms 7 exert oppositely directed forces on the segmental lugs 10 and the annular fulcrum surface 6 respectively, the axial components of these oppositely directed forces causing the tapered joint faces 2 and 3 to press against each other with sufficient force to seal the joint.

A tapered joint ring 14 of suitable resilient deformable material, such as rubber, is cemented or bonded to and forms part of bowl member 4 and provides the tapered sealing face 3 which may be accurately and smoothly formed either by hand laying of extruded jointing material or by moulding in situ against an appropriate form, thus avoiding the need to machine a tapered joint face on the hard material of the bowl member.

Figure 3:
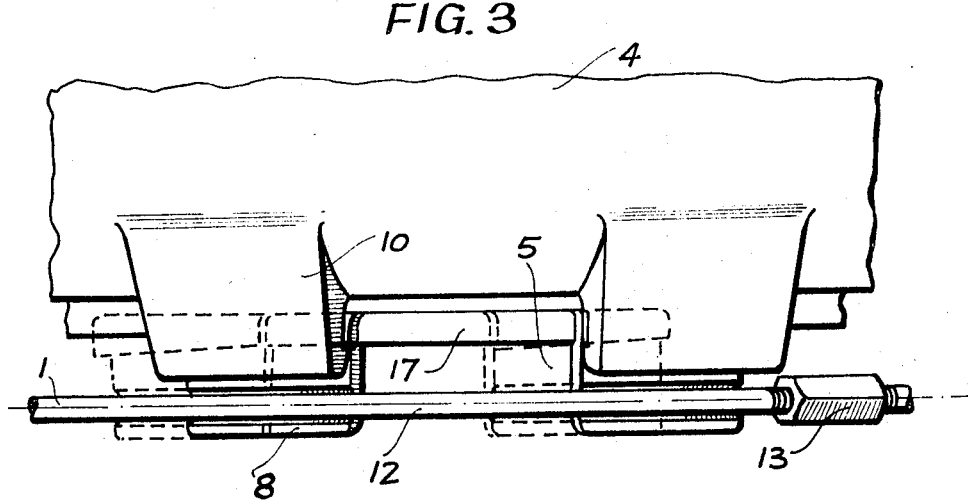
FIG. 3 is a part plan view on the line 3—3 of FIG. 1 showing a segmental lug and lever assembly.

The engaging faces 15 and 16 on the segmental lugs 10 and the radial lever arms 7, respectively, are helical with respect to the axis of the joint to enable the bell-crank levers 5 to be easily slipped into position with sufficient axial clearance to accommodate the joint ring 14, prior to its deformation, and dimensional variations in the various components, any excess clearance being taken up and initial locating pressure between the joint faces 2 and 3 being established by the circumferential movement of the bell-crank levers 5 with respect to the jointed members from an initial position such as shown in FIG. 3 in dotted outline to a final position as shown in full outline. Thereafter increased pressure between the tapered joint faces 2 and 3 may be obtained by tightening the tension ring member 12 by means of the tensioning nut 13.

The bell-crank levers 5 are arranged in separate assemblies each assembly comprising two levers connected by a segmental round torsion bar 17 which permits both relative and combined elastic angular movement of the levers to accommodate irregularities in form and dimension of the jointed members and which also generates, by its torsional deformation, locating pressures between the various components of the joint assembly to hold them in position prior to the tightening of the flexible tension ring member 12.

Figure 4:
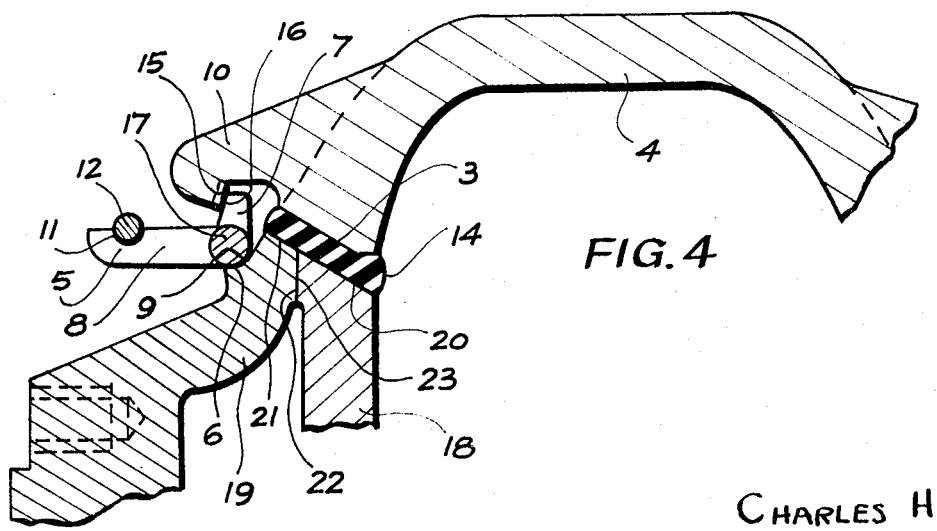
FIG. 4 is a part axial section of a pump casing showing a joint formed between three adjoining members.
Figure 2:
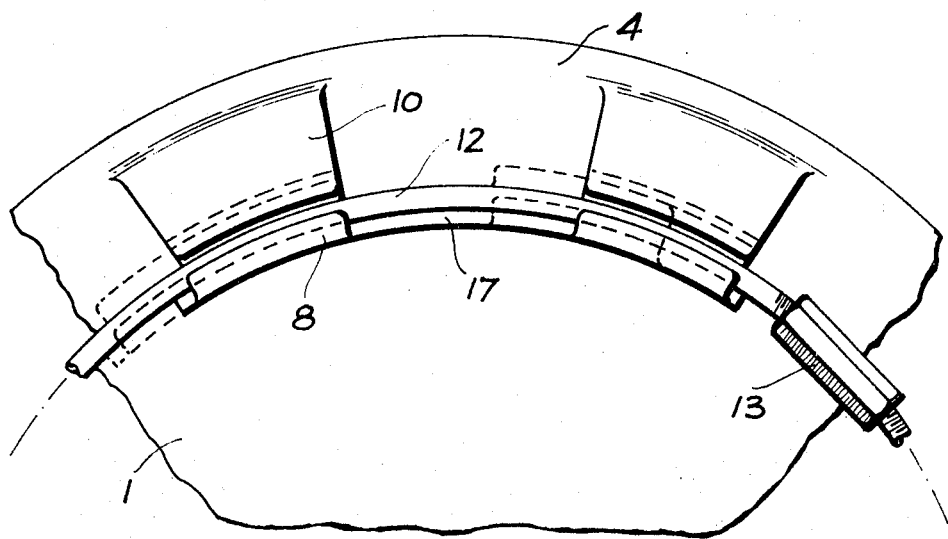
FIG. 2 is an elevation on the line 2—2 of FIG. 1.

In the variant form of construction shown in FIG. 4, two adjoining members, a back liner member 18 and a frame member 19, have matched peripheral surfaces 20 and 21 respectively which provide mutually the tapered annular sealing face or spigot which opposes the tapered bore 3 of the bowl member 4. Frame member 19 carries the annular concave fulcrum surface 6 and sealing pressure is transmitted in an axial direction across the matching surface 22 and 23 of members 19 and 18 respectively. In all other respects the construction is as described previously with respect to FIGS. 1, 2 and 3.

What I claim is:

1. A construction for jointed members comprising: at least two adjoining members having opposed matching tapered annular joint faces provided thereon; an annular fulcrum surface adjacent and co-axial with the external edge of the joint face on one of said adjoining members; a plurality of segmental lugs adjacent and co-axial with the external edge of the joint face on another of said adjoining members; a bell-crank lever for each segmental lug; each said bell-crank lever bearing at its fulcrum on said annular fulcrum surface and having arms approximately radial outward and axial therefrom; the radial arm of each said bell-crank lever being adapted to respectively engage one of said segmental lugs; the axial arm of each said bell-crank lever having a groove near the end thereof remote from its fulcrum; a tension ring member supported in said grooves and circumscribing said axial arms; adjustable means to contract said tension ring member to thereby draw said axial arms inwardly, the inward movement of said axial arms causing the radial arms of said bell-crank levers to exert oppositely directed forces against said segmental lugs and said annular fulcrum surface respectively with the axial components of these oppositely directed forces serving to press the joint faces of the adjoining members together with sufficient force to form a sealed joint between said adjoining members.

2. A construction for jointed members as claimed in claim 1 wherein at least one of the opposed matching tapered annular joint faces is formed on resilient deformable jointing material cemented or bonded to and forming part of one of said adjoining members.

3. A construction for jointed members as claimed in claim 1 wherein there are three adjoining members and one of the opposed matching tapered annular joint faces is provided mutually on and by two adjoining members which oppose one another axially.

4. A construction for jointed members as claimed in claim 1 wherein the engaging faces of the segmental lugs and the respective radial arms of the bell-crank levers have, with respect to the axis of the joint, matching helical forms and initial axial clearance, circumferential movement of the bell-crank levers relative to the jointed members serving to take up said initial axial clearance and to establish initial locating pressure between the joint faces of the adjoining members prior to contracting the tension ring.

5. A construction for jointed members as claimed in claim 1 wherein the bell-crank levers are arranged in separate assemblies with each said assembly comprising two or more levers connected by a segmental round torsion bar which permits both relative and combined elastic angular movement of the connected levers in each assembly.

* * * * *